(12) United States Patent
Tateno et al.

(10) Patent No.: US 9,086,032 B2
(45) Date of Patent: Jul. 21, 2015

(54) STIRLING ENGINE AND ENGINE SYSTEM COMPRISING STIRLING ENGINE

(75) Inventors: Manabu Tateno, Shizuoka-ken (JP); Masaaki Katayama, Susono (JP); Satosi Komori, Susono (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 302 days.

(21) Appl. No.: 13/617,646

(22) Filed: Sep. 14, 2012

(65) Prior Publication Data
US 2013/0074489 A1  Mar. 28, 2013

(30) Foreign Application Priority Data

Sep. 26, 2011 (JP) .................. 2011-209824

(51) Int. Cl.
| | | |
|---|---|---|
| F01B 29/10 | (2006.01) |
| F02G 1/04 | (2006.01) |
| F02G 3/00 | (2006.01) |
| F02G 1/043 | (2006.01) |
| F02G 5/02 | (2006.01) |

(52) U.S. Cl.
CPC ........ F02G 1/043 (2013.01); F02G 5/02 (2013.01); F02G 2254/15 (2013.01); Y02T 10/166 (2013.01)

(58) Field of Classification Search
CPC ............ F02G 5/02; F02G 5/04; F02G 1/043; F02G 2254/15; Y02T 10/166
USPC .............................. 60/516–526, 616
See application file for complete search history.

(56) References Cited

U.S. PATENT DOCUMENTS

| | | | |
|---|---|---|---|
| 4,738,106 A | 4/1988 | Yamaguchi | |
| 5,755,100 A * | 5/1998 | Lamos | 60/521 |
| 5,765,377 A | 6/1998 | Kim | |
| 6,093,504 A | 7/2000 | Bliesner | |
| 7,458,216 B2 * | 12/2008 | Yaguchi et al. | 60/616 |
| 2009/0013686 A1 * | 1/2009 | Yaguchi et al. | 60/597 |
| 2010/0257858 A1 | 10/2010 | Yaguchi et al. | |

FOREIGN PATENT DOCUMENTS

| | | |
|---|---|---|
| JP | 62-247160 A | 10/1987 |
| JP | 06147068 A | 5/1994 |
| JP | 09-105353 A | 4/1997 |
| JP | 2001-505638 A | 4/2001 |
| JP | 2004-301102 A | 10/2004 |
| JP | 2004-360661 A | 12/2004 |
| JP | 2009-133246 A | 6/2009 |
| JP | 2010-249005 A | 11/2010 |
| JP | 2010-255548 A | 11/2010 |

* cited by examiner

Primary Examiner — Christopher Jetton
(74) Attorney, Agent, or Firm — Gifford, Krass, Sprinkle, Anderson & Citkowski, P.C.

(57) ABSTRACT

A Stirling engine includes a base member that connects a housing portion with a heater that heats a working fluid using exhaust heat of a main engine, and a support member that supports the Stirling engine at the base member is provided.

10 Claims, 5 Drawing Sheets

STIRLING ENGINE AND ENGINE SYSTEM COMPRISING STIRLING ENGINE

CROSS REFERENCE TO RELATED APPLICATIONS

This application claims priority to Japanese Patent Application No. 2011-209824 filed on Sep. 26, 2011, which is incorporated herein by reference in its entirety including the specification, drawings and abstract.

BACKGROUND OF THE INVENTION

1. Field of the Invention

The invention relates to a Stirling engine and an engine system that includes the Stirling engine. More particularly, the invention relates to the structure of a Stirling engine that uses exhaust gas of an internal combustion engine as a high-temperature heat source and the structure of an engine system that includes the Stirling engine.

2. Description of Related Art

With regard to the structure of a Stirling engine, arts that are considered to be associated with the invention are disclosed in, for example, Japanese Patent Application Publication No. 62-247160 (JP-62-247160 A), Japanese Patent Application Publication No. 2004-301102 (JP-2004-301102 A), and Japanese Patent Application Publication No. 2010-255548 (JP-2010-255548 A). In Japanese Patent Application Publication No. 62-247160 (JP-62-247160 A), there is disclosed a double shell-type Stirling engine that includes an inner shell that is in a high-temperature, high-pressure state, and an outer shell that surrounds the inner shell and is filled with a heat insulating liquid. In Japanese Patent Application Publication No. 2004-301102 (JP-2004-301102 A), there is disclosed a Stirling engine having a base plate to which a cylinder and a heater are directly or indirectly fixed, the base plate being fixed to an exhaust pipe. In Japanese Patent Application Publication No. 2010-255548 (JP-2010-255548 A), there is disclosed a cooler structure for a Stirling engine that includes an outer cylinder, an inner cylinder that is formed in the outer cylinder, a cooler tube that is formed between the outer cylinder and the inner cylinder, and a heat insulating member that blocks the transfer of heat generated in the inner cylinder toward the cooler tube.

In a Stirling engine, a heater that exchanges heat between a high-temperature heat source and a working fluid is directly or indirectly fixed to a housing portion. As a result, however, when the housing portion becomes a heat transfer path from the heater, the internal pressure of a crankcase (i.e., the region of the housing portion, in which a crank portion of a crankshaft is provided) may rise due to the reception of heat by a gas in the crankcase. Thus, the work of the Stirling engine may decrease due to a decrease in the pressure difference between the internal pressure of the crankcase and the pressure of the working fluid that is applied to a piston from a top portion side thereof.

SUMMARY OF THE INVENTION

The invention provides a Stirling engine whose performance is enhanced by restraining the internal pressure of a crankcase from rising due to the reception of heat, and an engine system in which the performance of a Stirling engine is enhanced by restraining the internal pressure of a crankcase of the Stirling engine from rising due to the reception of heat.

A first aspect of the invention relates to a Stirling engine. The Stirling engine includes a base member that connects a housing portion with a heater that heats a working fluid using exhaust heat of a main engine, and a support member that supports the Stirling engine at the base member is provided.

In the Stirling engine in accordance with the foregoing aspect of the invention, a first heat insulating member may be provided between the base member and the housing portion.

In the Stirling engine in accordance with the foregoing aspect of the invention, a cylinder liner may be provided in the housing portion so as to abut on the base member, and a second heat insulating member may be provided in the housing portion so as to be positioned on an outer peripheral portion of the cylinder liner.

A second aspect of the invention relates to an engine system that includes a main engine and a Stirling engine that operates using exhaust heat of the main engine as a heat source. The Stirling engine includes a housing portion; a heater that heats a working fluid in the Stirling engine using the exhaust heat of the main engine; a base member that connects the housing portion with the heater; and a support member that supports the base member with respect to the main engine by connecting the base member with the main engine.

According to the foregoing aspects of the invention, by restraining the internal pressure of the crankcase from rising due to the reception of heat, the performance of the Stirling engine is enhanced.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENT

The embodiment of the invention will be described using the drawings.

Figure 1:
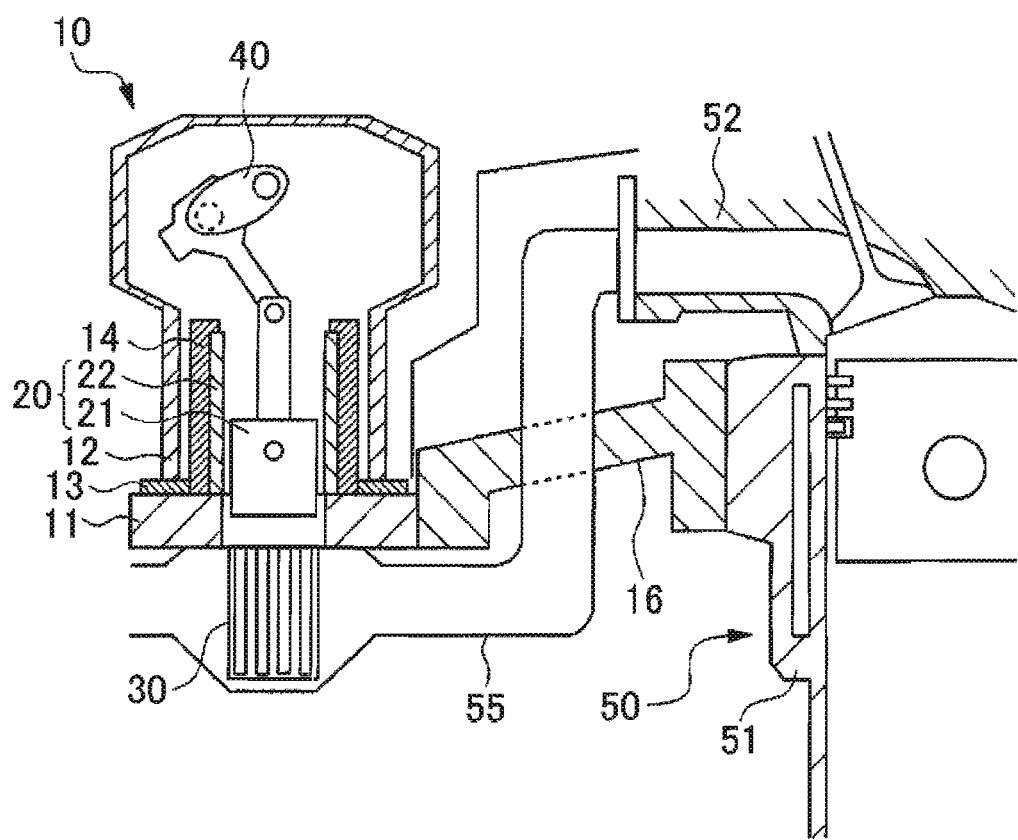
FIG. 1 is a general view of components including a Stirling engine in accordance with an embodiment of the invention.

FIG. 1 is a general view of components including a Stirling engine 10. The components shown in FIG. 1 are mounted on a vehicle (not shown). A Stirling engine 10 is an α-type Stirling engine, and includes a cylinder 20 and a crankshaft 40. The cylinder 20 includes a piston 21 and a cylinder liner 22. The piston 21 is connected to the crankshaft 40 via a link mechanism. Reciprocating motions of the piston 21 are converted into rotational motions by the crankshaft 40.

The Stirling engine 10 includes heaters 30. The heaters 30 are provided so as to be positioned in an exhaust pipe 55 of an internal combustion engine 50, and exchanges heat between a working fluid that flows and exhaust gas of the internal combustion engine 50. Thus, the working fluid is heated by exhaust heat of the internal combustion engine 50. Air is used as the working fluid. However, the working fluid is not limited to air. For example, a gas such as He, $H_2$, $N_2$, or the like can be used as the working fluid. The internal combustion engine 50 includes a cylinder block 51 and a cylinder head 52. The internal combustion engine 50 is provided with a cooling system that causes a coolant to circulate therethrough. The cylinder block 51 and the cylinder head 52 are appropriately cooled by the coolant. The internal combustion engine 50 may be regarded as the main engine.

The Stirling engine 10 includes a base member 11, a cylinder case 12, a first heat insulator or first heat insulating member 13, and a second heat insulator or second heat insulating member 14. The base member 11 connects the heaters 30 with the cylinder case 12. In this respect, more specifically, the cylinder case 12 is indirectly fixed to the base member 11 via the first heat insulating member 13 that is provided between the cylinder case 12 and the base member 11. The first heat insulating member 13 may be realized by, for example, a gasket. In the cylinder case 12, the cylinder liner 22 is provided so as to abut on the base member 11. Besides, the second heat insulating member 14 is provided on an outer peripheral portion of the cylinder liner 22. An appropriate material may be used as the second heat insulating member 14.

The cylinder case 12 is configured as a member that is integral with a crankcase in which a crank portion of the crankshaft 40 is accommodated. The cylinder case 12 may be configured as a member separate from the crankcase. The Stirling engine 10 is supported at the base member 11 by a support member 16 that connects the internal combustion engine 50 with the base member 11. The support member 16 firmly connects the internal combustion engine 50 with the base member 11, thereby making it unnecessary to fix the cylinder case 12 including the crankcase.

Figure 2:
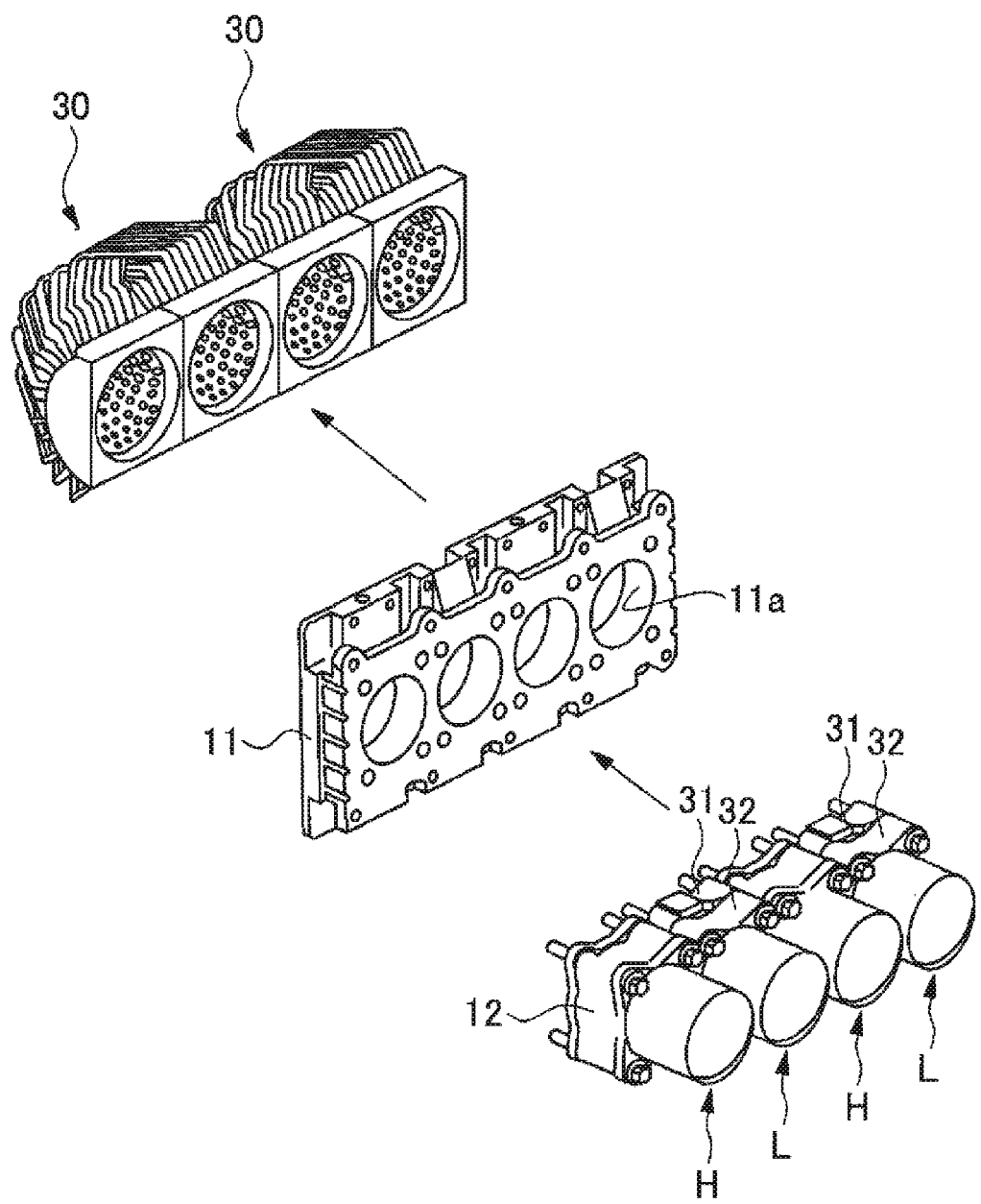
FIG. 2 is an exploded configuration view of a region around a base member in accordance with the embodiment of the invention.

FIG. 2 is an exploded configuration view of a region around the base member 11. More specifically, the Stirling engine 10 is configured to include a plurality of sets (two sets in this case) of a high temperature-side cylinder H and a low temperature-side cylinder L. The high temperature-side cylinders H and the low temperature-side cylinders L are arranged along the crankshaft 40. Thus, the Stirling engine 10 is realized as a multi-cylinder α-type Stirling engine that includes four cylinders. Thus, a plurality of (four in this case) opening portions 11a are so provided as to correspond to the cylinders respectively. The high temperature-side cylinders H are constituted by the cylinders 20, and the cylinder case 12 accommodates the respective high temperature-side cylinders H and the respective low temperature-side cylinders L.

More specifically, the working fluid, which flows in a reciprocating manner between the high temperature-side cylinders H and the low temperature-side cylinders L, flows through the heaters 30. Thus, the Stirling engine 10 includes a plurality of (two in this case) heaters 30. Besides, the Stirling engine 10 includes regenerators 31 and coolers 32 that are provided between the heaters 30 and the low temperature-side cylinders L. The working fluid that is heated by the heaters 30 flows into the high temperature-side cylinders H. After heat is released from the working fluid in the regenerators 31, the working fluid is cooled by the coolers 32, and then flows into the low temperature-side cylinders L. In each of the high temperature-side cylinders H, the piston 21 operates due to the expansion of the working fluid. In each of the low temperature-side cylinders L, the working fluid is compressed by the piston.

In this respect, the cylinder liner 22 needs to be firmly joined to the base member 11 such that the high-temperature, high-pressure working fluid does not leak between each of the high temperature-side cylinders H and the base member 11 and the cylinder liner 22 is deformed in accordance with thermal deformation of the base member 11. Thus, from a structural point of view, the high temperature-side cylinders H in which the conduction of heat to the cylinder liner 22 is unavoidable are structured such that heat is likely to be released from the cylinder liner 22.

In order to firmly join the cylinder liner 22 to the base member 11, the base member 11 and the cylinder liner 22 can be formed as an integral member by, for example, directly producing the cylinder liner 22 on the base member 11, or welding the cylinder liner 22 to the base member 11. However, the invention is not limited to this configuration. The cylinder liner 22 may be firmly joined to the base member 11 by a fastening member, for example, a bolt or the like. In the case where the cylinder liner 22 as a separate body is firmly joined to the base member 11, the base member 11 can be provided with, for example, a groove in which the cylinder liner 22 is fitted. By forming the base member 11 and the cylinder liner 22 as an integral member, the working fluid can be easily prevented from leaking even if the number of cylinders in the Stirling engine 10 is increased to four or more.

In the Stirling engine 10, the cylinder liner 22 is firmly joined to the base member 11. As a result, a difference in thermal expansion is created between the cylinder liner 22 and the cylinder case 12. In this respect, changes in relative positional relationship between the piston 21 and the crankshaft 40, which result from this difference in thermal expansion, can be automatically adjusted by, for example, providing a universal joint in a link mechanism between the piston 21 and the crankshaft 40. Alternatively, such changes can be automatically adjusted by, for example, allowing the crankshaft 40 to move along an axial direction of bearings.

Figure 3:
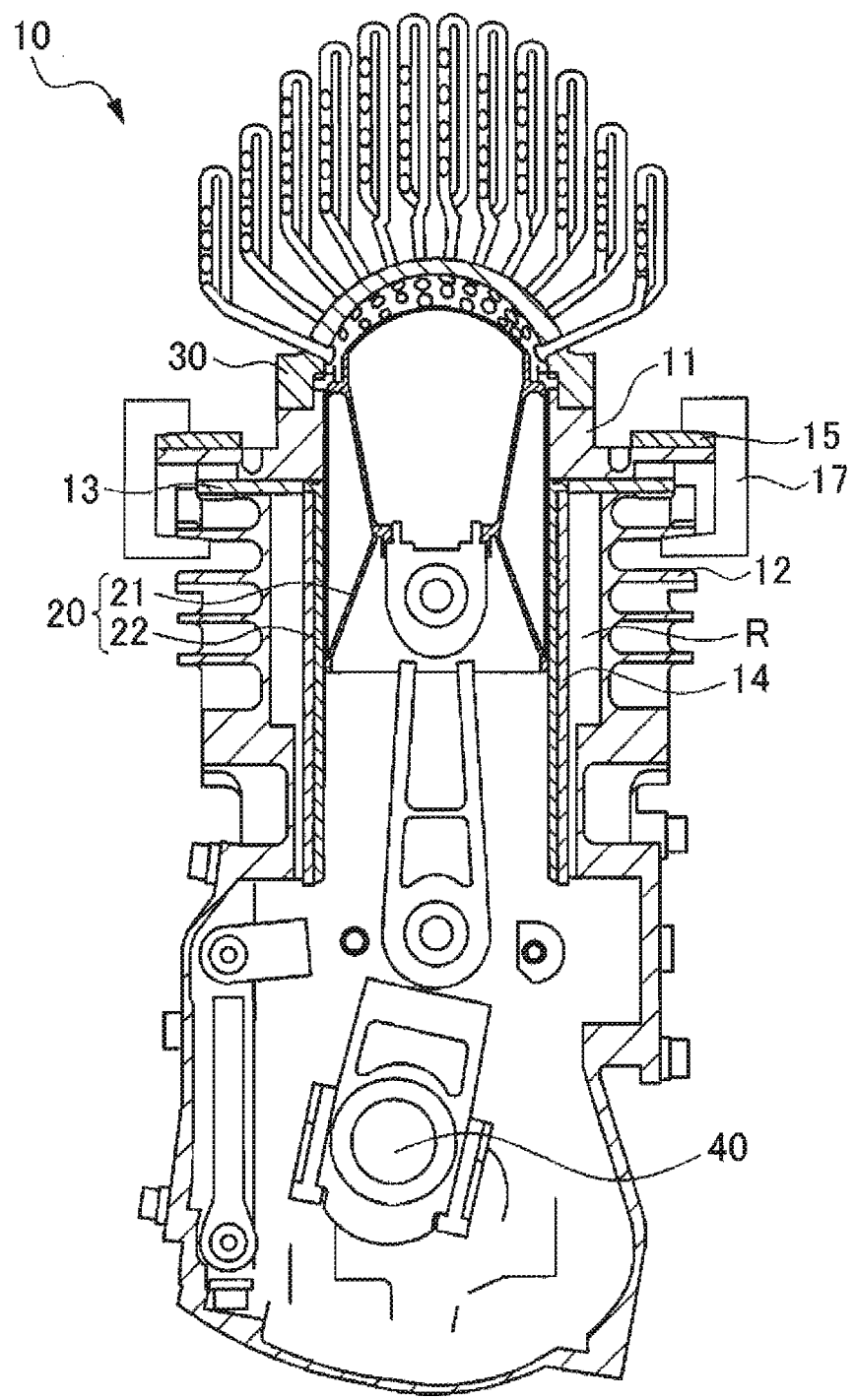
FIG. 3 is a cross-sectional view of the Stirling engine alone in accordance with the embodiment of the invention.

FIG. 3 is a cross-sectional view of the Stirling engine 10 alone. FIG. 3 concretely shows a cross-section of the Stirling engine 10 alone, whose main part is constituted by a region on the cylinder 20-side. In the Stirling engine 10, more specifically, the cylinder liner 22 is provided such that a space layer R is formed between the cylinder case 12 and the second heat insulating member 14. The space layer R communicates with the interior of the crankcase. The same gas as the gas in the crankcase is present in the space layer R.

The Stirling engine 10 includes a third heat insulating member 15 and a fixation mechanism 17. The third heat insulating member 15 is provided between the base member 11 and the fixation mechanism 17. The fixation mechanism 17 fixes the base member 11 to the cylinder case 12 in a clamping manner (i.e., in a manner such that the base member 11 and a part of the cylinder case 12 are clamped in the fixation mechanism 17). The third heat insulating member 15 may be provided, for example, between the cylinder case 12 and the fixation mechanism 17.

Figure 4:
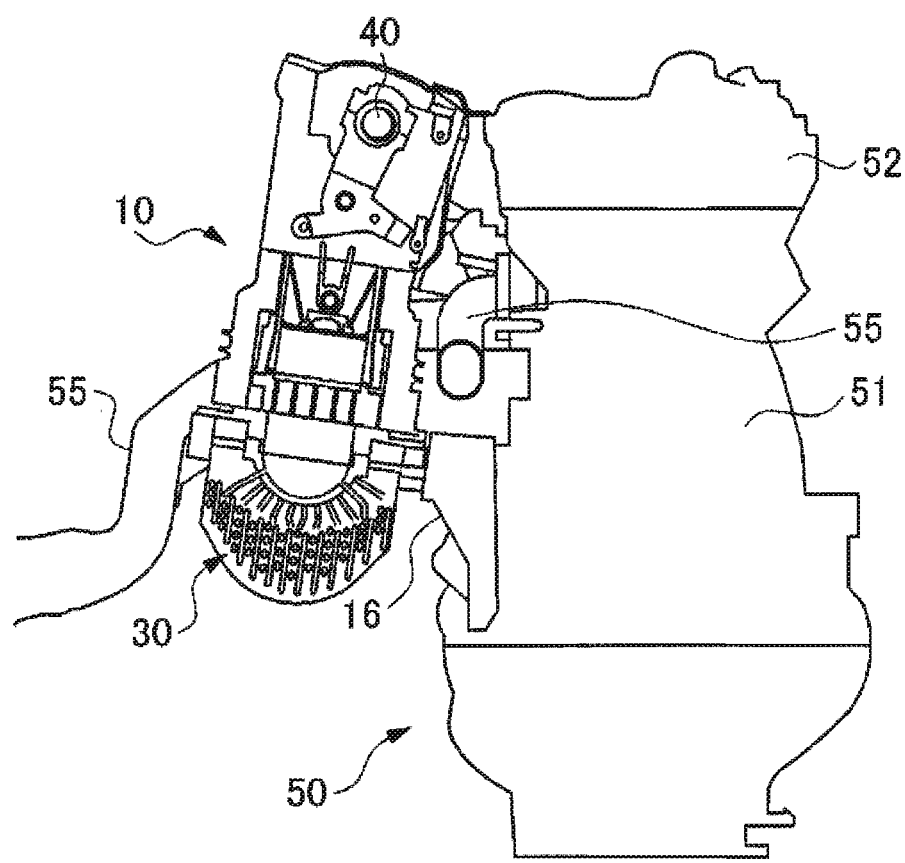
FIG. 4 is a first view showing an example in which the Stirling engine in accordance with the embodiment of the invention is mounted.

FIG. 4 is a first view showing an example in which the Stirling engine 10 is mounted. As shown in FIG. 4, in an area on the side of the exhaust-side portion of the internal combustion engine 50, the Stirling engine 10 is supported by the support member 16, with the heaters 30 arranged on the side of the cylinder block 51 of the internal combustion engine 50, and with the crankshaft 40 arranged on the side of the cylinder head 52 of the internal combustion engine 50. The Stirling engine 10 may be supported by the support member 16, with the heaters 30 arranged on the side of the cylinder head 52, and with the crankshaft 40 arranged on the side of the cylinder block 51.

Figure 5:
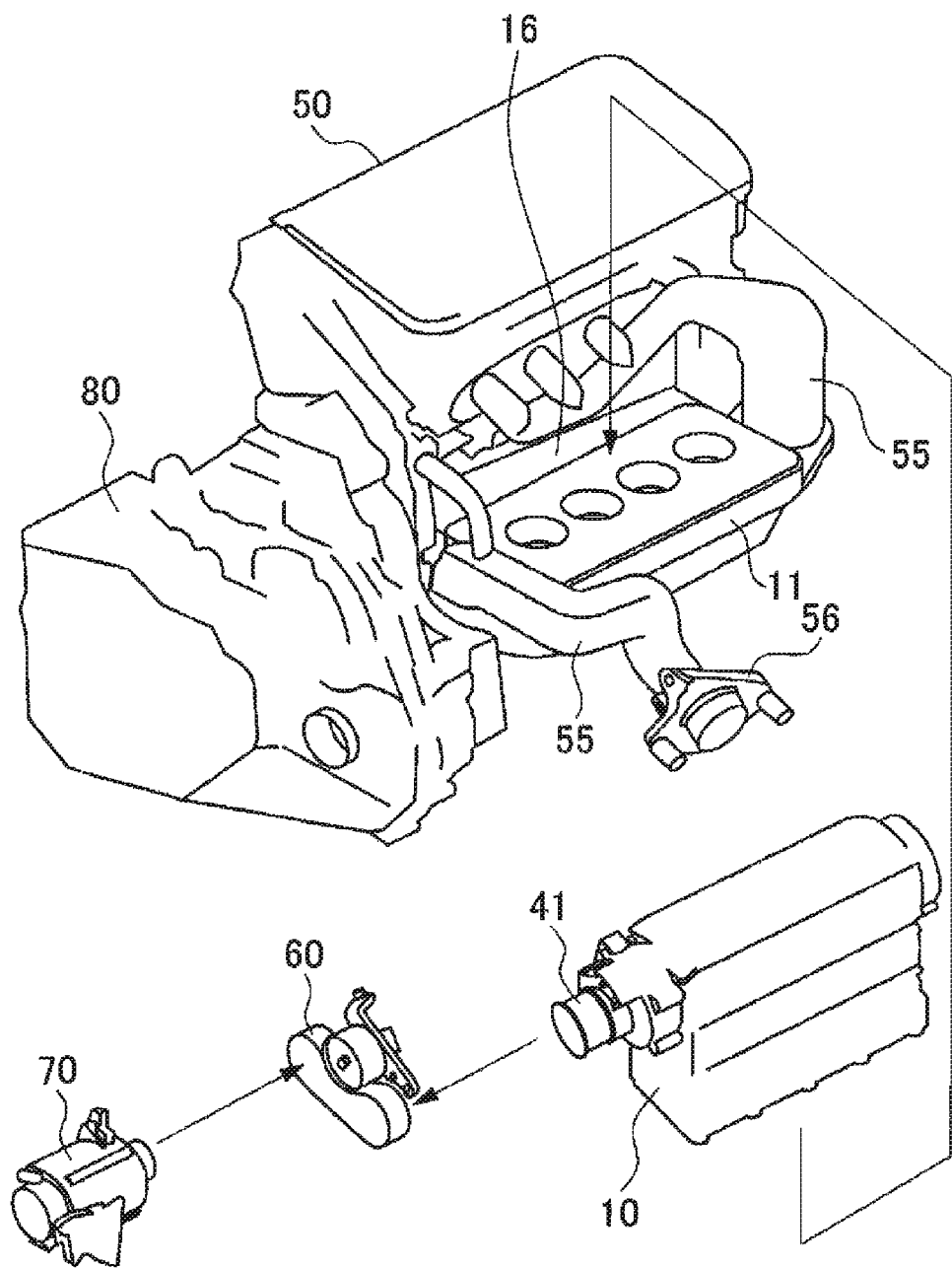
FIG. 5 is a second view showing an example in which the Stirling engine in accordance with the embodiment of the invention is mounted.

FIG. 5 is a second view showing an example in which the Stirling engine 10 is mounted. For the convenience of explanation, part of the configuration is shown in an exploded state in FIG. 5. As shown in FIG. 5, more specifically, the support member 16 connects the exhaust-side lateral portion of the internal combustion engine 50 with the base member 11. In other words, the support member 16 supports the base member 11 with respect to the internal combustion engine 50 by connecting the base member 11 with the internal combustion engine 50. Besides, the base member 11 is fixed to the exhaust pipe 55. That region of the exhaust pipe 55, which is provided with the base member 11, is intrinsically a region having a certain degree of freedom with respect to the internal combustion engine 50. In this respect, a vibration absorption portion 56 that prevents vibrations of the internal combustion engine 50 from being transmitted to the vehicle via the exhaust pipe 55 is provided in a region of the exhaust pipe 55, which is located downstream of the region where the base member 11 is provided.

An output of the Stirling engine 10 is transmitted from an output pulley 41 to an electric generator 70 via a belt 60. The output pulley 41 is provided on the crankshaft 40. The output of the Stirling engine 10 does not necessarily need to be transmitted to the electric generator 70 via the belt 60, and may be transmitted to the electric generator 70 via a power transmission mechanism (e.g., a resinous gear) having a heat insulating property. Besides, the output of the Stirling engine 10 does not necessarily need to be transmitted to the electric generator 70. For example, the output of the Stirling engine 10 may be transmitted, as power, to a transmission 80 joined to the internal combustion engine 50. As a result of firmly joining the cylinder liner 22 to the base member 11, the position of the crankshaft 40 with respect to a power transmission destination changes in accordance with the difference in thermal expansion between the cylinder liner 22 and the cylinder case 12. However, such a change in the position can be absorbed by, for example, the belt 60.

In this embodiment of the invention, the structure of the Stirling engine is realized over the Stirling engine 10, the support member 16, the internal combustion engine 50, the exhaust pipe 55, the output pulley 41, and the belt 60. Besides, in this embodiment of the invention, a housing portion is realized by the cylinder case 12 including the crankcase, a housing of the regenerator 31, and a housing of the cooler 32. In this respect, more specifically, the housing portion can be realized as a region of the cylinder case 12, which serves to accommodate the high temperature-side cylinders H.

Next, the main operation and advantageous effects of the structure of the Stirling engine in this embodiment of the invention will be described. The Stirling engine 10 in accordance with this embodiment of the invention includes the cylinder case 12, the heaters 30 that heat the working fluid using exhaust heat of the internal combustion engine 50, the base member 11 that connects the heaters 30 with the cylinder case 12, and the support member 16 that supports the Stirling engine 10 at the base member 11. Thus, in the Stirling engine 10 in accordance with this embodiment of the invention, the crankcase can be prevented from becoming a heat transfer path to the support member 16. As a result, the performance of the Stirling engine 10 can be enhanced by restraining the internal pressure of the crankcase from rising due to the reception of heat.

In this embodiment of the invention, more specifically, the support member 16 connects the internal combustion engine 50 with the base member 11 to support the Stirling engine 10. In this case, the difference in temperature between the base member 11 and the crankcase can also be reduced by transferring heat from the base member 11 to the internal combustion engine 50 provided with a cooling system, via the support member 16. Thus, in the Stirling engine 10 in accordance with this embodiment of the invention, the internal pressure of the crankcase can also be restrained from rising due to the reception of heat, because the transfer of heat from the base member 11 to the crankcase is restrained.

The Stirling engine 10 in accordance with this embodiment of the invention further includes the first heat insulating member 13 that is provided between the base member 11 and the cylinder case 12. Thus, in the Stirling engine in accordance with this embodiment of the invention, heat can also be restrained from being transferred from the base member 11 to the cylinder case 12. Thus, the internal pressure of the crankcase is restrained from rising due to the reception of heat, so that the performance of the Stirling engine 10 can be more suitably enhanced.

The Stirling engine 10 in accordance with this embodiment of the invention farther includes the cylinder liner 22 that is provided in the cylinder case 12 so as to abut on the base member 11, and the second heat insulating member 14 that is provided in the cylinder case 12 so as to be positioned on the outer peripheral portion of the cylinder liner 22. Thus, in the Stirling engine 10 in accordance with this embodiment of the invention, heat can also be restrained from being transferred from the cylinder liner 22 to the cylinder case 12. Thus, the internal pressure of the crankcase is further restrained from rising due to the reception of heat, so that the performance of the Stirling engine 10 can be more suitably enhanced.

Besides, in this case, when heat is released from the cylinder liner 22, heat is mainly released only from an inner peripheral portion of the cylinder liner 22. In this respect, the heat release from the inner peripheral portion is the heat release to the working fluid whose heat quantity has decreased due to, for example, expansion work. Furthermore, this heat release is smaller than heat release from the outer peripheral portion, because the area of the inner peripheral portion, with which the working fluid comes into contact, is decreased by the piston 21. Thus in this case, the performance of the Stirling engine 10 can also be enhanced by reducing heat loss due to the heat release from the cylinder liner 22.

In the Stirling engine 10 in accordance with this embodiment of the invention, more specifically, the cylinder liner 22 is provided such that the space layer R is formed between the cylinder case 12 and the second heat insulating member 14. Thus, the cylinder liner 22 is allowed to be thermally deformed in accordance with thermal deformation of the base member 11. In this respect, in the Stirling engine 10 in accordance with this embodiment of the invention, the area of the cylinder liner 22, with which the gas in the crankcase comes into contact, can be made equal to or smaller than a half thereof, by providing the cylinder liner 22 and the second heat insulating member 14 as described above. Thus, the performance of the Stirling engine 10 can be more suitably enhanced by further restraining the internal pressure of the crankcase from rising due to the reception of heat.

In the Stirling engine in accordance with this embodiment of the invention, the difference in temperature between the cylinder liner 22 and the working fluid in the cylinder liner 22 can also be decreased by providing the cylinder liner 22 in the cylinder case 12 such that the cylinder liner 22 abuts on the base member 11. Thus, the cylinder liner 22 is prevented or restrained from removing heat from the working fluid, so that the performance of the Stirling engine 10 can also be enhanced. In this respect, in the Stirling engine in accordance with this embodiment of the invention, by providing a heat insulating member on a top portion of the piston 21, the working fluid can further be restrained from releasing heat.

In the Stirling engine 10 in accordance with this embodiment of the invention, by providing the second heat insulating member 14 on the outer peripheral portion of the cylinder liner 22, the following advantageous effects can also be obtained. That is, in the case where a heat insulating member is provided on the inner peripheral portion of the cylinder liner 22, the heat insulating member is required to exhibit high processing accuracy in order to realize an appropriate clearance between the heat insulating member and the piston 21. Besides, since the heat insulating member is exposed to high-temperature, high-pressure working fluid and is required to exhibit abrasion resistance, the range of choice for selecting the material of the heat insulating member is narrow. In contrast, in the Stirling engine 10 in accordance with this embodiment of the invention, by providing the second heat insulating member 14 on the outer peripheral portion of the cylinder liner 22, the range of choice for selecting the method of producing the heat insulating member, and the range of choice for selecting the material of the heat insulating member can be increased. As a result, cost can be reduced.

The Stirling engine 10 in accordance with this embodiment of the invention further includes the fixation mechanism 17 that fixes the base member 11 to the cylinder case 12 in a clamping manner, and the third heat insulating member 15 that is provided between the fixation mechanism 17 and at least one of the base member 11 and the cylinder case 12. Thus, the fixation of the cylinder case 12 to the base member 11 can also be strengthened while restraining heat from being transferred from the base member 11 to the crankcase.

The Stirling engine 10 in accordance with this embodiment of the invention is supported by the support member 16, with the heaters 30 arranged on the side of the cylinder block 51 of the internal combustion engine 50 and with the crankshaft 40 arranged on the side of the cylinder head 52 of the internal combustion engine 50, in the area on the side of the exhaust-side portion of the internal combustion engine 50. Due to this structure, the exhaust pipe 55 that is extended downward in the vehicle can be arranged easily without waste.

The Stirling engine 10 in accordance with this embodiment of the invention further includes the belt 60 as a power transmission mechanism having a heat insulating property, so that heat can be restrained from being transferred from the electric generator 70 to the crankcase when the output of the Stirling engine 10 is transmitted to the electric generator 70 that is a power transmission destination. Besides, since this power transmission mechanism is provided, it is possible to avoid the situation where the crankcase has a heat transfer path to the outside other than a path for heat transfer to outside air as well as the support member 16.

Although the embodiment of the invention has been described above in detail, the invention is not limited to this specific embodiment thereof, but can be modified in various manners within the scope of the invention as stated in the claims. For example, the invention is applicable not only to an α-type Stirling engine but also to any appropriate Stirling engine.

What is claimed is:

1. A Stirling engine adapted for use with a main engine having a cylinder block and a cylinder head, said Stirling engine comprising:
   a housing portion;
   a heater that heats a working fluid using exhaust heat of the main engine;
   a base member that connects the housing portion with the heater;
   a cylinder liner provided in the housing portion so as to abut on the base member;
   a heat insulator provided in the housing portion so as to be positioned on an outer peripheral portion of the cylinder liner; and
   a support member that secures the base member to one of the cylinder block and the cylinder head to support the Stirling engine.

2. The Stirling engine according to claim 1 further comprising: an additional heat insulator provided between the base member and the housing portion.

3. The Stirling engine according to claim 1, wherein the cylinder liner is provided such that a space layer is formed between the housing portion and the heat insulator.

4. An engine system comprising:
   a main engine having a cylinder block and a cylinder head;
   a Stirling engine that operates using exhaust heat of the main engine as a heat source, the Stirling engine including:
      a housing portion;
      a heater that heats a working fluid in the Stirling engine using the exhaust heat of the main engine;
      a base member that connects the housing portion with the heater; and
      a support member that secures the base member to the cylinder block to support the Stirling engine with respect to the main engine.

5. The engine system according to claim 4, wherein the Stirling engine further includes a first heat insulator provided between the base member and the housing portion.

6. The engine system according to claim 4, wherein the Stirling engine further includes a cylinder liner provided in the housing portion so as to abut on the base member, and a second heat insulator provided in the housing portion so as to be positioned on an outer peripheral portion of the cylinder liner.

7. The engine system according to claim 6, wherein the cylinder liner is provided such that a space layer is formed between the housing portion and the second heat insulator.

8. The Stirling engine according to claim 1, wherein the support member secures the base member to the cylinder block to support the Stirling engine.

9. An engine system comprising:
   a main engine;
   a Stirling engine that operates using exhaust heat of the main engine as a heat source, the Stirling engine including:
      a housing portion;
      a heater that heats a working fluid in the Stirling engine using the exhaust heat of the main engine;
      a base member that connects the housing portion with the heater;
      a support member that supports the base member with respect to the main engine by connecting the base member with the main engine;
      a cylinder liner provided in the housing portion so as to abut on the base member; and
      heat insulator provided in the housing portion so as to be positioned on an outer peripheral portion of the cylinder liner.

10. The engine system according to claim 9, wherein the cylinder liner is provided such that a space layer is formed between the housing portion and the heat insulator.

* * * * *